US007693767B2

(12) United States Patent
Petriuc

(10) Patent No.: US 7,693,767 B2
(45) Date of Patent: Apr. 6, 2010

(54) METHOD FOR GENERATING PREDICTIVE MODELS FOR A BUSINESS PROBLEM VIA SUPERVISED LEARNING

(75) Inventor: Cezar Daniel Petriuc, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1012 days.

(21) Appl. No.: 11/387,259

(22) Filed: Mar. 23, 2006

(65) Prior Publication Data

US 2007/0226095 A1 Sep. 27, 2007

(51) Int. Cl.
*G06Q 40/00* (2006.01)
(52) U.S. Cl. .......................................... 705/35; 705/37
(58) Field of Classification Search .................. 707/10, 707/100; 705/10–44
See application file for complete search history.

(56) References Cited

U.S. PATENT DOCUMENTS

| | | | | |
|---|---|---|---|---|
| 6,029,154 A * | 2/2000 | Pettitt | ............................ | 705/44 |
| 6,957,770 B1 * | 10/2005 | Robinson | ..................... | 235/382 |
| 7,096,192 B1 * | 8/2006 | Pettitt | ............................ | 705/26 |
| 7,149,296 B2 * | 12/2006 | Brown et al. | ................. | 379/145 |
| 7,266,693 B1 * | 9/2007 | Potter et al. | .................. | 713/169 |
| 7,403,922 B1 * | 7/2008 | Lewis et al. | ..................... | 705/38 |
| 7,539,644 B2 * | 5/2009 | Hu et al. | ......................... | 705/38 |
| 7,578,438 B2 * | 8/2009 | Hogg et al. | .................. | 235/380 |
| 7,610,040 B2 * | 10/2009 | Cantini et al. | ................ | 455/410 |

OTHER PUBLICATIONS

Arnfield, Robin, "Retail decisions takes the lead in fraud prevention . . . ", Cards International, p10(2), Oct. 22, 2001, dialog file 16, Accession No. 09167371.*

* cited by examiner

*Primary Examiner*—Frantzy Poinvil
(74) *Attorney, Agent, or Firm*—Townsend and Townsend and Crew LLP

(57) ABSTRACT

A method for solving a business problem includes pooling transaction data received from a plurality of subscribers over a network, the transaction data including samples of fraudulent transactions. A data mining algorithm is then applied to the pooled transaction data, resulting in a predictive model that detects a fraudulent transaction. The predictive model is then provided to the subscribers in exchange for a subscription fee. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

9 Claims, 2 Drawing Sheets

ND FOR GENERATING PREDICTIVE
METHOD FOR GENERATING PREDICTIVE MODELS FOR A BUSINESS PROBLEM VIA SUPERVISED LEARNING

FIELD OF THE INVENTION

The present invention relates generally to information technology in a business enterprise; more specifically, to data mining techniques and algorithms used to discover hidden insights and patterns present in data.

BACKGROUND OF THE INVENTION

A paramount concern in a modern enterprise is to understand the quality of its particular business. For example, it is often difficult to identify the value that a particular business entity has in the dimension of fraud, as it relates to business transactions. Often times, identification of fraudulent transactions involves analyzing data to uncover hidden insights or patterns. In the field of computer science, data mining algorithms have traditionally been utilized across a variety of industries to uncover hidden insights into data.

By way of example, U.S. Pat. No. 6,836,773 teaches an enterprise-wide web data mining system that generates a plurality of data mining models for generating a prediction or recommendation using data collected from the Internet. An integrated data mining and relational database management system that makes patterns uncovered during data mining available in virtual relational database tables that can be queried is described in U.S. Pat. No. 6,629,095. Similarly, U.S. Pat. No. 6,708,163 teaches a collective data mining approach for finding patterns from a network of databases, each with a distinct feature space. The approach is useful distributed fault detection in an electrical power distribution network. By way of further example, U.S. Pat. No. 6,480,844 teaches a method for mining information from large volumes of data regarding transactions of a multitude of parties.

Data mining algorithms generally fall into two broad categories of learning techniques: supervised learning and unsupervised learning. Unsupervised learning techniques can be used to discover associations and clusters in data, independent of a particular business objective. Alternatively, supervised learning techniques can construct predictive models for particular dimensions of a business problem, such as whether a transaction is fraudulent or not.

A good predictive model needs to be able to uncover patterns that are not obvious or intuitive. However, generating good predictive models for identifying particular dimensions of a business problem using supervised learning typically requires large sets of data. One particular business problem that has received much attention is the problem of detecting fraudulent transactions. A large database of fraudulent transactions is usually needed in order to train the model to differentiate between the two categories (i.e., fraudulent or legitimate) based on the hidden trends inherent to fraud. It is also important that the data set be balanced in a way that produces a good model. For example, if there are only a few fraudulent transactions in the example, and the rest are non-fraudulent, the resulting predictive model might not be able to accurately differentiate between the two categories. Often times, individual organizations lack a large enough sample of fraudulent transactions, as well as data of different types, needed to generate an adequate predictive model.

A number of different approaches to the problem of fraud detection have been proposed. For example, a technique for automatically designing a fraud detection system using a series of machine learning methods is described in U.S. Pat. No. 5,790,645. U.S. Patent Publication 2005/0182712 teaches a data-driven model for detecting fraudulent behavior where statistically significant data elements are not known in advance.

A primary drawback of existing fraud detection systems and methods is that many enterprises suffer from an inadequate volume or number of business transactions (e.g., fraudulent transactions) needed to generate an accurate predictive model. For instance, a single organization in good financial standing typically lacks a large enough sample of fraudulent transactions with which to generate an adequate model. This constitutes a fundamental barrier to learning the inherent structure of corporate fraud.

What is needed, therefore, is a method and/or system that overcomes the problems inherent in the prior art approaches, and which permits the construction of more accurate predictive models for business problems such as fraud detection.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

The present invention provides a method for generating predictive models useful in identifying particular dimensions of a business problem. In the following description numerous specific details are set forth, such as particular business problems, data acquisition methods, and details of specific embodiments in order to provide a thorough understanding of the present invention. However, persons having ordinary skill in the communication arts will appreciate that these specific details may not be needed to practice the present invention.

Figure 1:
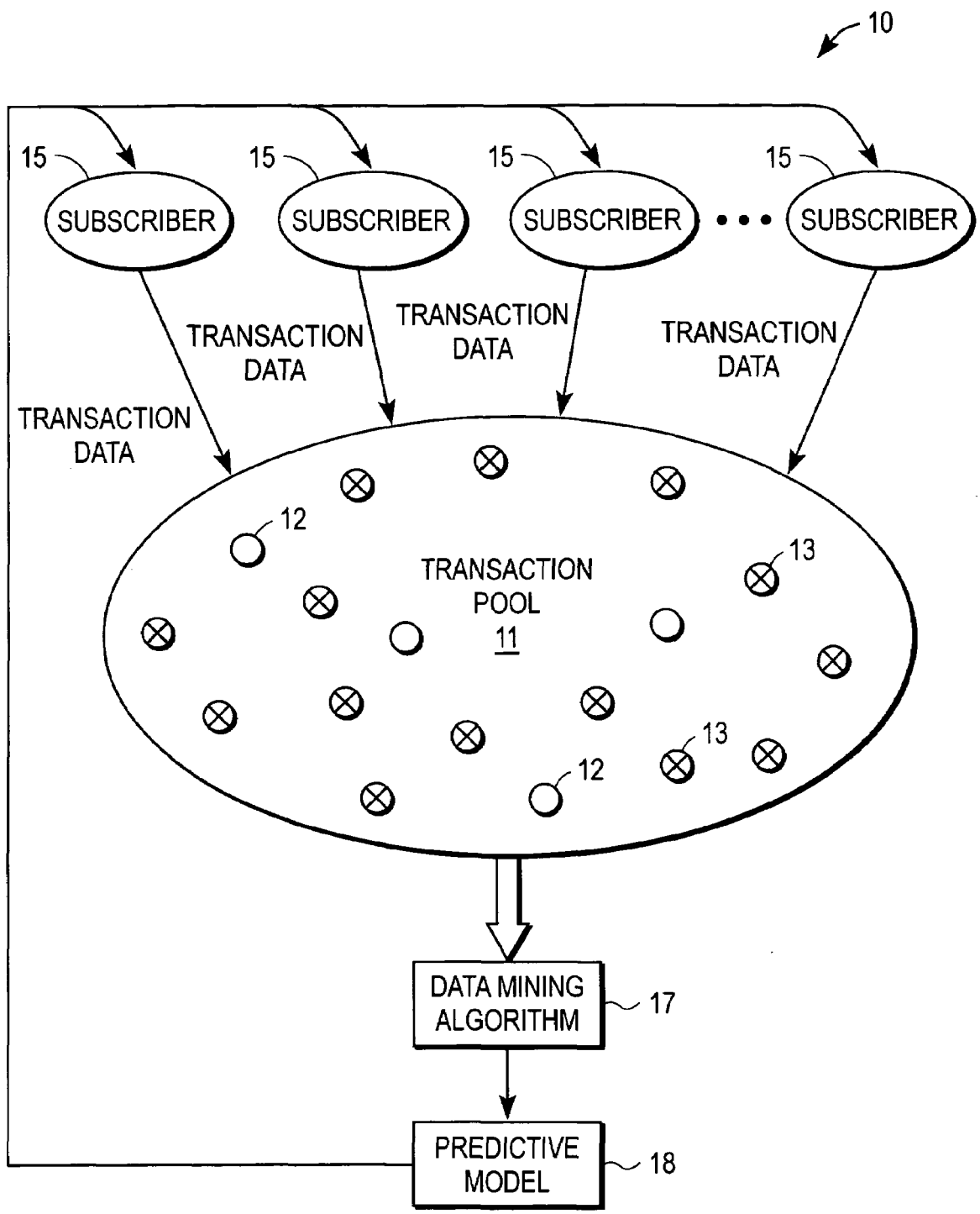
FIG. 1 is a conceptual block diagram of a system according to one embodiment of the present invention.

FIG. 1 shows a conceptual block diagram of a system 10 according to one embodiment of the present invention. System 10 may be implemented as a stand-alone computer or data processing unit. The system 10 may also be implemented as a server-based application in which subscribers 15 interact via an agent such as a web browser or another server or other software. The server may include hardware and software elements for managing the various functions and component elements described herein. For example, a server in accordance with one embodiment of the present invention may comprise a memory or database that stores a pool of transaction data. It is appreciated that system 10 may be located at any location, for example, in a business enterprise premises or offsite connected via a global communications network such as the Internet. Alternatively, system 10 may be implemented in a distributed environment (e.g., part within an enterprise's premise and part on the Internet).

In a basic embodiment, the present invention comprises a business method in which a business entity sells subscriptions to other businesses or entities interested in obtaining highly accurate predictive models for their particular business problem. In the example of FIG. 1, a plurality of subscribers 15 enter into an agreement with a business service provider (SP) wherein the SP provides each of them with a predictive model useful in detecting fraudulent transactions, as might occur, for example, in the banking industry. As a term or condition of their subscription, each subscriber 15 agrees to provide or submit some set of transaction data to a transaction pool 11, which is managed by the business entity. Ideally, the transaction data submitted by the subscriber's includes examples of fraudulent transactions along with non-fraudulent transaction data.

The transaction pool 11, itself, may be implemented as a memory or data storage unit configured as a relational database. Transaction data may be submitted to pool 11 through a variety of known mechanisms, such as personal computers, servers, or other devices connected via a public network to the server, relational database, or mass storage device that comprises transaction pool 11. Data may be submitted in accordance with a normative data model or data format. Examples of communication networks include a local area network ("LAN"), a wide area network ("WAN"), and the Internet. Furthermore, the systems may be connected via a wireless network, e.g., a wireless LAN. System 10 may also include additional servers, subscribers, and other devices not shown.

In the example of FIG. 1, subscribers 15 submit transaction data, shown as circles 12 & 13, to populate a transaction pool 11. The empty circles 12 represent non-fraudulent transaction data; whereas crossed circles 13 represent fraudulent data transactions. Once a sufficiently large pool 11 of transaction data has been accumulated or collected from subscribers 15, one or more data mining algorithms 17 are applied to the pool of data in order to output or generate a predictive model 18. In accordance with their business agreement, or as part of their subscription service, each of the subscribers 15 is provided with a copy of the resulting predictive model 18. In other words, in exchange for signing up to the subscription service offered by the business SP (and possibly also contributing transaction data to the transaction pool 11) each subscriber 15 receives a highly-accurate predictive model 18 generated from the existent transaction data, which includes a "rich" pool of fraudulent transactions 13. In this context, a "rich" transaction data refers to a large variety of data that provides different hidden patterns and modalities of fraudulent transactions.

In one embodiment, system 10 is implemented as an Internet portal where registered subscribers 15 contribute fraudulent transactions in exchange for the value of receiving and using the predictive model 18 generated from the existent data in pool 11, which model uncovers the hidden patterns in data pool 11. Practitioners in the art will understand that more than one predictive model 18 may be generated by the data mining algorithm 17. That is, multiple types of models may be created by data mining algorithm 17. Additionally, it is appreciated that more than one algorithm 17 may be applied to the transaction data in pool 11 to identify hidden patterns in the data.

It is appreciated that a variety of different business models may be employed in conjunction with system 10. For instance, subscribers 15 who contribute significant examples or sets of fraudulent transactions may be provided with a reduced subscription rate or fee. Other subscribers, who might contribute little or no transaction data to pool 11, may be charged a higher fee for a subscription service that provides them with predictive model 18. For example, once pool 11 has been populated with data representing a sufficiently large number of fraudulent transactions, new subscribers may be charged a higher subscription rate under terms that does not obligate them to submit any transaction data to pool 11.

In one implementation, access to predictive model(s) 18 may be offered with restrictions on the period of availability based on the number of transactions contributed. During a given subscription period, the resulting predictive model(s) 18 may change or evolve over time as more and more transaction data 16 enters the transaction pool 11. Each registered subscriber is provided with the new, more recent predictive model as it is generated. The predictive model, itself, may comprise a variety of different forms or formats, such as simple correlation rules, decision-tree queries, and the like.

By way of specific example, a substantial quantity of transaction data may be supplied to the transaction pool 11 by subscribers 15 such as banks, financial institutions, credit card companies, and other types of business entities. In this manner, the predictive models 18 generated by the data mining algorithms 17 are improved by having a wide variety of fraudulent transactions 13 and non-fraudulent transactions 12 in pool 11. The data mining algorithms 17 uncover the hidden patterns inherent in the fraudulent transactions, thereby enabling subscribers 15 to then use the predictive models 18 to detect when a particular transaction is potentially fraudulent or otherwise problematic.

In order to ensure that transaction data 16 contributed by subscribers 15 across a variety of organizations and industries are pooled properly, the business SP of system 10 may enforce a normative format (i.e., a normative data model). Thus, subscribers 15 who wish to contribute fraudulent transaction data 16 to the transaction pool 11 may first prepare the data in the normative format, obfuscating sensitive aspects such as the identity of the organization. In one embodiment, the business service provider of system 10 may also take measures aimed at ensuring that the contributing subscribers 15 are legitimate and that their transaction data 16 represents legitimate instances of fraud. For instance, this process may involve some type of an intermediary (e.g., internal or external auditors).

Figure 2:
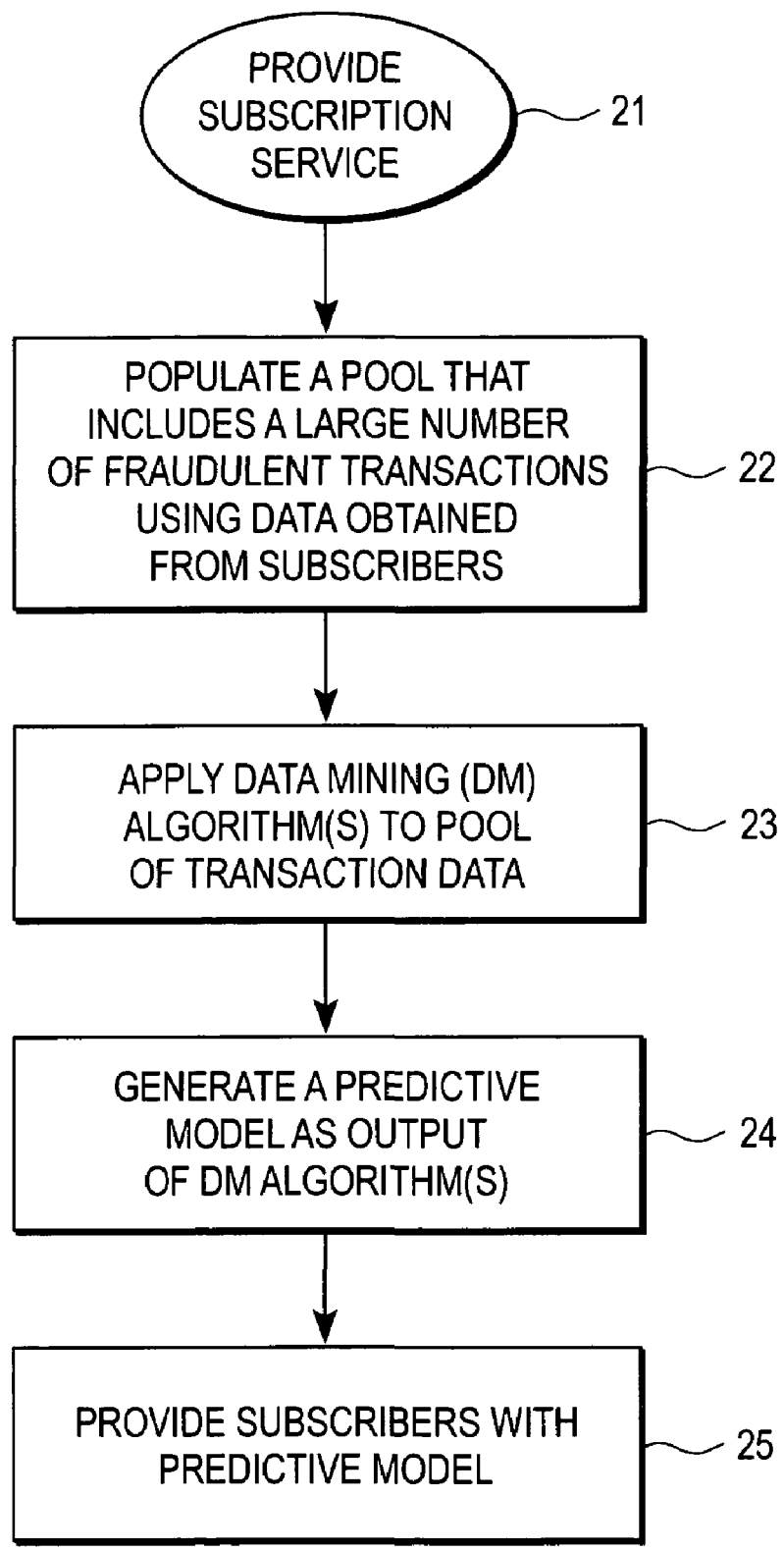
FIG. 2 is a flow chart illustrating a method useful in detecting fraudulent transactions according to one embodiment of the present invention.

FIG. 2 is a flow chart illustrating a method useful in detecting fraudulent transactions according to one embodiment of the present invention. In the exemplary process shown, a subscription service is provided to entities (block 21) such as companies, individuals, the government, etc., interested in obtaining accurate predictive models. Subscribers collectively provide a sufficiently large amount or number of fraudulent transactions (and possibly a certain number of legitimate transactions) which is used to populate the transaction pool (block 22). After the pool has been sufficiently populated, one or more data mining algorithms are applied to this rich pool of data to produce one or more predictive models (block 24). The predictive model(s) are then made available to each of the registered subscribers (block 25).

It should be understood that elements of the present invention may also be provided as a computer program product which may include a "machine-readable medium" having stored thereon instructions which may be used to program a computer (e.g., a processor or other electronic device) to perform a sequence of operations. A "machine-readable medium" may include any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

I claim:

1. A method for solving a business problem, comprising:
    pooling, in a data storage unit configured as a relational memory, transaction data received from a plurality of subscribers over a network, the transaction data including samples of fraudulent and non-fraudulent transactions, the samples of fraudulent transactions include a variety of fraud patterns from across different industries;
    inputting the pooled transaction data into a processor configured to execute a data mining algorithm, when the data mining algorithm is executed the processor outputting a predictive model that detects a fraudulent transaction; and
    providing a copy of the predictive model to the subscribers in exchange for a fee.

2. The method of claim 1 further comprising:
    enrolling the subscribers.

3. The method of claim 1 wherein the transaction data complies with a normative data format.

4. A method for solving a business problem, comprising:
    offering subscriptions to business entities, with a first type of subscription being offered to a first subscriber at a first subscription fee in exchange for contribution of a first quantity of transaction data from the first subscriber, and a second type of subscription being offered to a second subscriber at a second subscription fee in exchange for contribution of a second quantity of transaction data from the second subscriber, wherein the first subscription fee is higher than the second subscription fee and the first quantity of transaction data is greater than the second quantity of transaction data, the transaction data including samples of fraudulent and non-fraudulent transactions, the samples of fraudulent transactions include a variety of fraud patterns from across different industries;
    receiving, at a computer, the transaction data via a network portal, the transaction data being pooled in a data storage unit configured as a relational memory, the data storage unit being associated with the computer;
    inputting the pooled transaction data into the computer, the computer being configured to execute a data mining algorithm, when the computer executes the data mining algorithm the computer outputting a predictive model useful in detecting a fraudulent transaction;
    providing a copy of the predictive model to the subscribers;
    periodically updating the predictive model by re-executing the data mining algorithm on the computer using new pooled transaction data, the new pooled transaction data including additional transaction data received from the subscribers that includes new samples of fraudulent and non-fraudulent transactions; and
    providing a copy of the updated predictive model to the subscribers.

5. The method of claim 4 wherein the transaction data complies with a normative data format.

6. A computer-readable memory encoded with a computer program for a business service provider, when executed, the computer program operable to:
    register as subscribers, business entities from across different industries;
    populate a data storage unit configured as a relational memory with transaction data contributed by the subscribers, the transaction data including samples of fraudulent and non-fraudulent transactions;
    inputting the transaction data into a computer configured to execute a data mining algorithm, when the data mining algorithm is executed, the computer generating a predictive model that detects one or more hidden patterns in the fraudulent transactions; and
    provide a copy of the predictive model to the subscribers.

7. The computer-readable memory of claim 6 further comprising:
    preparing the transaction data in accordance with a normative data format.

8. The computer-readable memory of claim 6 wherein the predictive model if provided to the subscribers for a fee.

9. The computer-readable memory of claim 6 further comprising:
    restricting access to the predictive model by a subscriber based on a number of fraudulent transactions contributed by the subscriber.

* * * * *